J. W. BENNETT.
WINDMILL.
APPLICATION FILED NOV. 15, 1911.
1,055,858.
Patented Mar. 11, 1913.
3 SHEETS—SHEET 2.
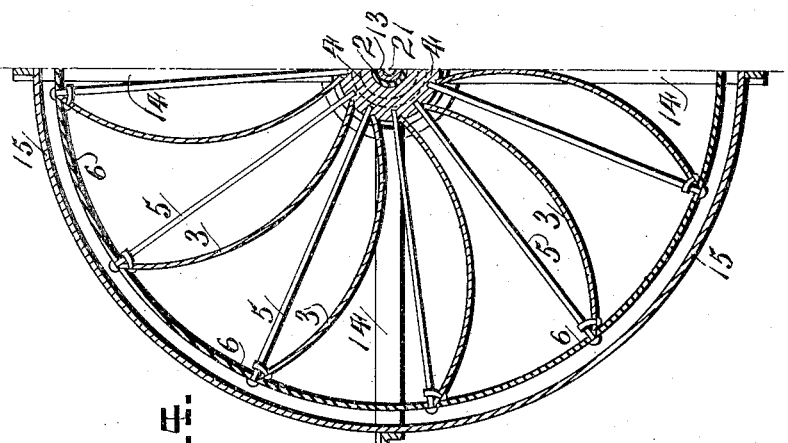
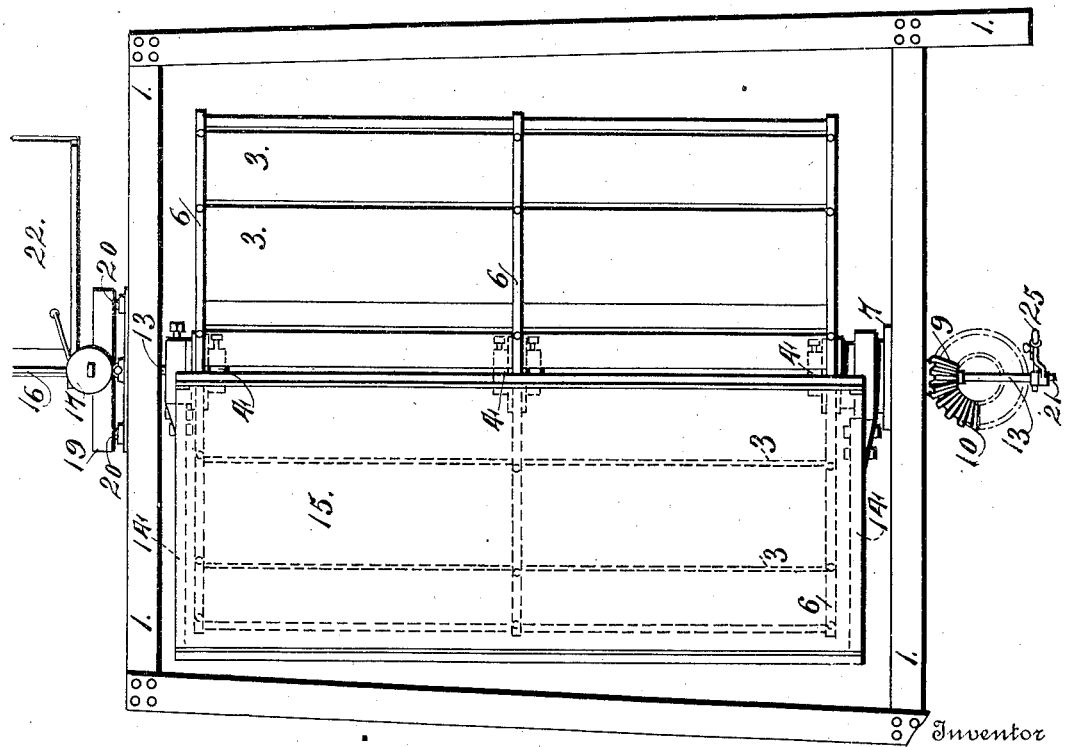
Witnesses
Inventor
Joseph W. Bennett.
By Victor J. Evans
Attorney

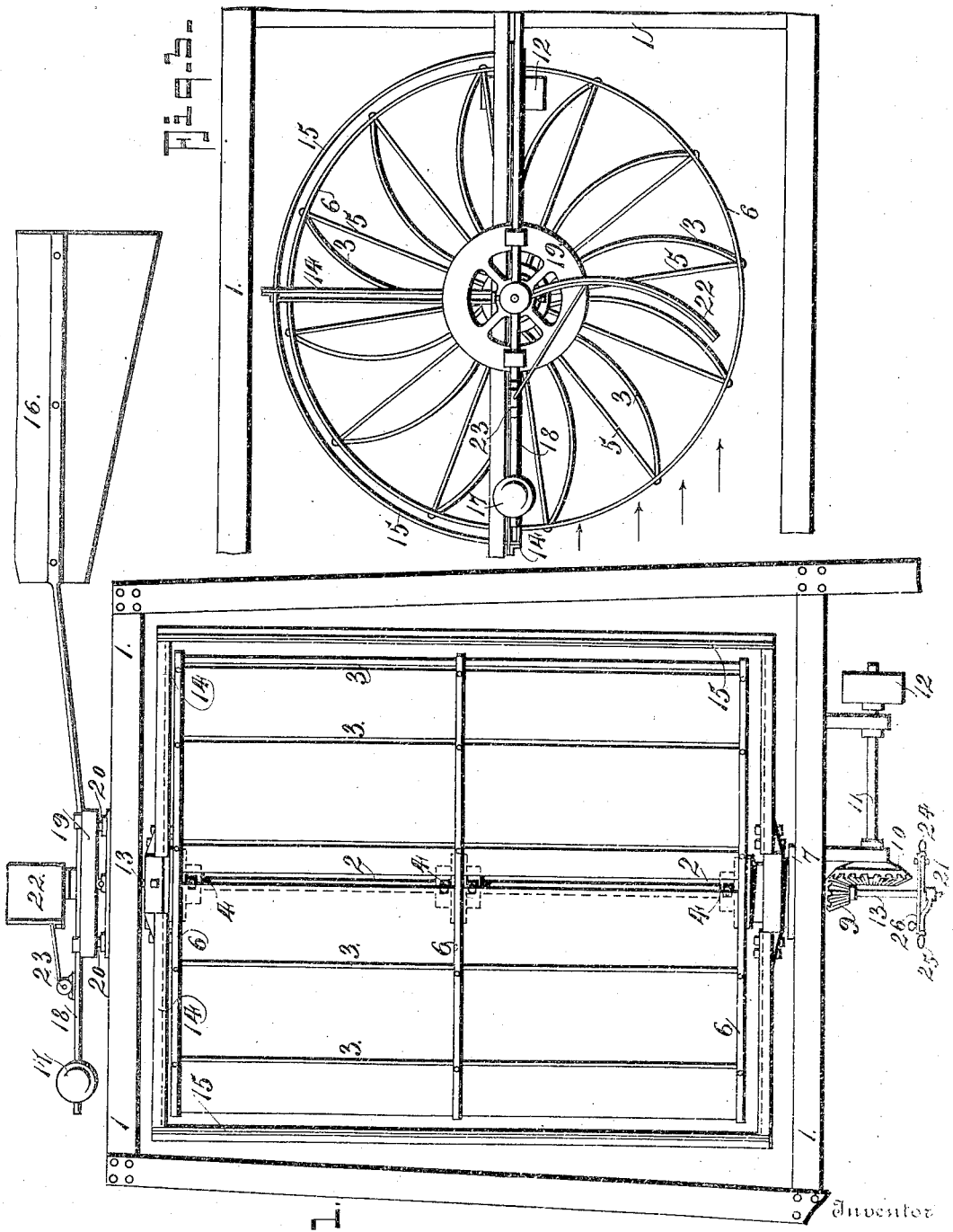

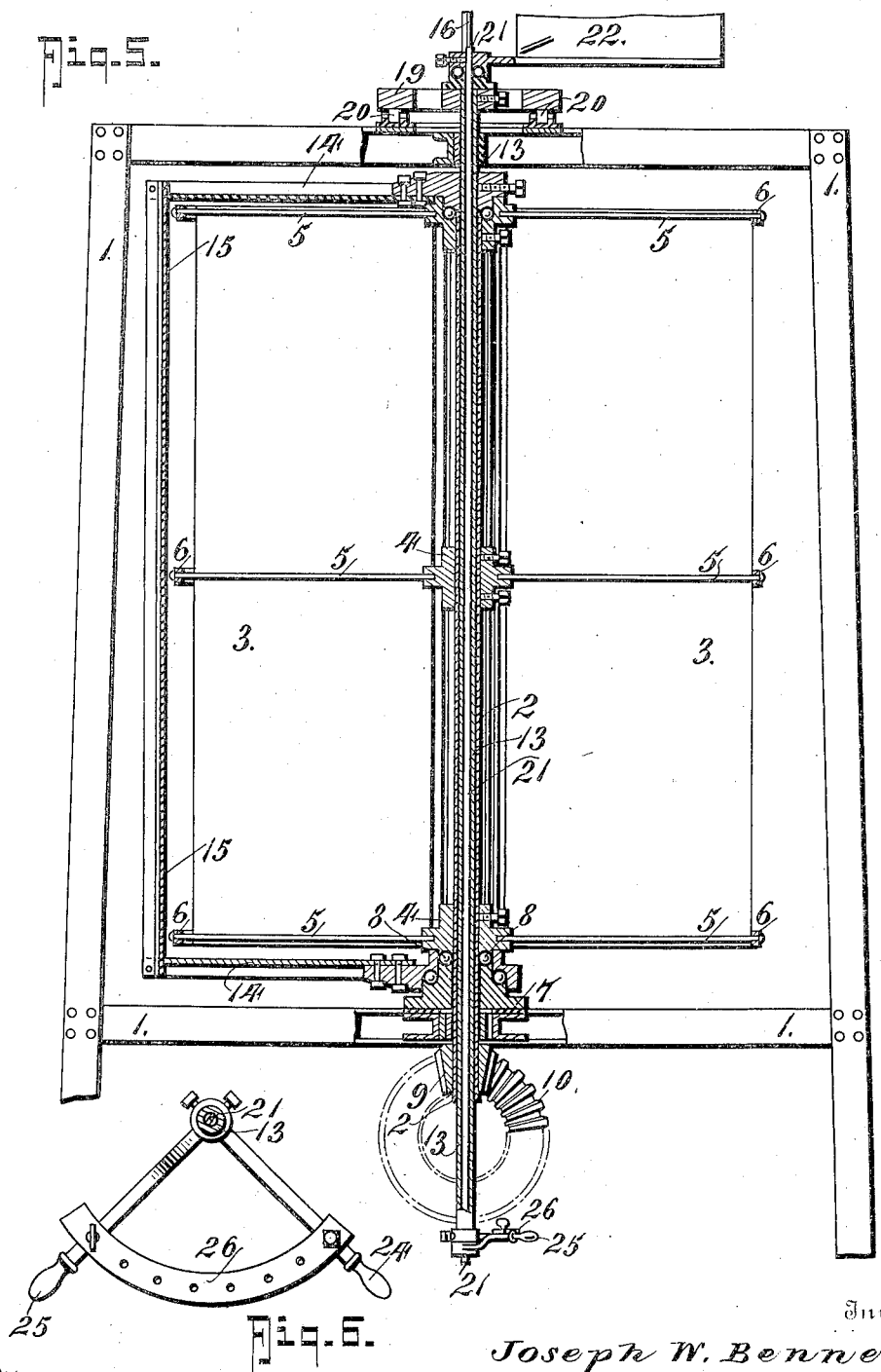

UNITED STATES PATENT OFFICE.

JOSEPH W. BENNETT, OF PORTLAND, OREGON.

WINDMILL.

1,055,858.  Specification of Letters Patent.  Patented Mar. 11, 1913.

Application filed November 15, 1911. Serial No. 660,492.

*To all whom it may concern:*

Be it known that I, JOSEPH W. BENNETT, a citizen of the United States, residing at Portland, in the county of Multnomah and State of Oregon, have invented new and useful Improvements in Windmills, of which the following is a specification.

The present invention provides a windmill in which the wind wheel is arranged in a horizontal plane to rotate about a vertical axis, thereby enabling the length of the wings to be extended to obtain any degree of surface for the current of air to expend its force upon without varying the diameter of the wheel.

The invention contemplates peculiar mountings for the wind wheel and a novel form of shield and manner of supporting the same whereby the shield may be adjusted by hand or arranged to be operated automatically or adapted to be set to any relative position and controlled by the force of the air to automatically move the shield to cover a greater or less extent of the wheel proportionately to the velocity and force of the wind.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of a windmill embodying the invention. Fig. 2 is a front view, looking at the windmill at a right angle to Fig. 1. Fig. 3 is a top plan view. Fig. 4 is a horizontal section. Fig. 5 is a vertical section, showing more clearly the several shafts and the bearings. Fig. 6 is an enlarged view of the shield adjusting levers.

Corresponding and like parts are referred to in the following description, and indicated in all the views of the drawings, by the same reference characters.

The tower or supporting framework is indicated at 1 and may be of any construction.

The wind wheel comprises a hollow shaft 2, wings 3, hubs 4, spokes 5 and rings 6. The hubs 4 are secured to the shaft 2 and receive the inner ends of the spokes 5, the latter being connected at their outer ends by the rings 6 and the wings 3 being attached to the spokes 5. The wind wheel is arranged in a horizontal plane with its shaft 2 vertical. A bearing 7 is located upon cross pieces forming the tower or supporting structure and supports the wind wheel, ball bearings 8 being interposed between the lower end of the wind wheel and the bearing 7 to reduce the friction to the smallest amount possible. The hollow shaft 2 extends through the bearing 7 and below the cross pieces upon which the bearing rests and is provided at its lower end with a bevel pinion 9 which is in mesh with a bevel gear wheel 10 secured to the inner end of a horizontal shaft 11 to which is fitted a belt pulley 12 from which power is taken to drive any machinery by means of a drive belt in the well known manner.

A hollow shaft 13 passes through the hollow shaft 2 and extends above and below said shaft and has upper and lower arms 14 secured thereto, said arms supporting a semi-circular shield 15 which is adapted to inclose one-half of the wind wheel. The relative position of the shield determines the extent of surface of the wings of the wind wheel exposed to receive the force expended by the current of air to drive the engine. A vane 16 has connection with the shaft 13 and serves to hold the wind wheel full in the wind. The vane 16 is counterbalanced by means of a weight 17, which latter is attached to an arm 18 projecting in a diametrically opposite direction from the vane 16. A turn table 19 is secured to the upper end of the shaft 13 and is arranged to travel upon wheels 20 forming antifriction bearings, thereby enabling the shield and parts attached thereto to turn easily so as to be moved by a light wind. The turn-table 19 may be of any construction and is arranged above the tower and supports the shield and parts connected thereto. The wheels 20 are supported upon the tower and may be of any construction.

A shaft 21 passes through the shaft 13 and extends above and below said shaft and has a governor vane 22 attached to its upper end, said governor vane being arranged to extend at a right angle to the plane of the vane 16 and adapted to be connected to the arm 18 by means of a spring or weight so that under an excessive pressure of air, as when blowing a gale or hurricane, the shield will be turned to cover wholly or in part the effective portion of the wind wheel, which under ordinary conditions receives the force of the air expended for driving the engine. When the force of the wind abates the spring or weight 23 returns the shield 15 to normal position so that the wind may act upon the predetermined surface of the wings exposed. In order that the shield may be set to expose a given amount of wind surface for the action of the air levers 24 and 25 are secured to the lower end of the respective shafts 13 and 21 and these levers may be adjustably connected by means of a curved bar 26, which is attached permanently to one of the levers and adjustably to the other lever. By adjusting the levers 24 and 25 the shield may be moved so as to cover more or less of the wind wheel in the direction facing the wind, thereby preventing damage to the engine in a high wind. By making the connection 26 yieldable it is possible to set the shield to protect the engine in the event of a high wind and at the same time admitting of the shield being further moved by a gale so as to throw the engine out of the wind should an excessive velocity be reached approaching a hurricane or gale.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a windmill, the combination of a wind wheel arranged horizontally and having a hollow shaft, a second hollow shaft passing through the shaft of the wind wheel and extending above and below the same, upper and lower horizontal arms connected with the second shaft above and below the wind wheel, a shield arranged to cover a part of the wind wheel secured to said arms, a counterbalanced vane connected with said second shaft for holding the shield in a given relative position with reference to the wind wheel and current of air, a third shaft passing through the second shaft and extending above and below the same, a second vane having connection with the third shaft, connecting means between the second and third shafts, and means for relatively adjusting the said second and third shafts to normally adjust the relative angular position of the two vanes.

2. In a windmill, the combination of a supporting framework, a hollow shaft mounted on the framework, a horizontal wind wheel having connection with said hollow shaft, a second hollow shaft passing through the first mentioned hollow shaft and extending above and below the same, arms secured to the second hollow shaft above and below the wind wheel, a shield for covering a portion of the wind wheel attached to the said arms, a turntable connected to the upper end of the second hollow shaft, antifriction bearings between said turntable and the supporting framework, a vane connected with said second shaft, a weighted arm for counterbalancing said vane extending from the second shaft in opposition thereto, a third shaft passing through the second shaft and extending above and below the same, a second vane connected with the upper end of the third shaft and arranged to normally extend approximately at a right angle to the first mentioned vane, connecting means between the second vane and the before mentioned weighted arm, levers connected to the second and third shafts below the wind wheel, and adjustable connecting means between the two levers.

In testimony whereof I affix my signature in presence of two witnesses.

JOSEPH W. BENNETT.

Witnesses:
W. J. WORTHEN,
D. I. COOPER.